(12) United States Patent
Intriligator

(10) Patent No.: US 11,434,002 B1
(45) Date of Patent: Sep. 6, 2022

(54) PERSONAL DRONE ASSISTANT

(71) Applicant: Robert Intriligator, Los Angeles, CA (US)

(72) Inventor: Robert Intriligator, Los Angeles, CA (US)

( * ) Notice: Subject to any disclaimer, the term of this patent is extended or adjusted under 35 U.S.C. 154(b) by 151 days.

(21) Appl. No.: 15/152,106

(22) Filed: May 11, 2016

(51) Int. Cl.
| | | |
|---|---|---|
| *H04N 7/18* | (2006.01) | |
| *B64C 39/02* | (2006.01) | |
| *G06T 7/70* | (2017.01) | |
| *H04N 5/225* | (2006.01) | |
| *G06F 3/0488* | (2022.01) | |
| *B64D 47/08* | (2006.01) | |
| *G05D 1/12* | (2006.01) | |
| *B64C 25/32* | (2006.01) | |
| *B64D 47/02* | (2006.01) | |
| *G01C 11/02* | (2006.01) | |

(52) U.S. Cl.
CPC ............ *B64C 39/024* (2013.01); *B64C 25/32* (2013.01); *B64D 47/02* (2013.01); *B64D 47/08* (2013.01); *G05D 1/12* (2013.01); *G06F 3/0488* (2013.01); *G06T 7/70* (2017.01); *H04N 5/2256* (2013.01); *H04N 7/18* (2013.01); *H04N 7/181* (2013.01); *H04N 7/183* (2013.01); *B64D 2211/00* (2013.01); *G01C 11/02* (2013.01); *G01C 11/025* (2013.01)

(58) Field of Classification Search
CPC .......... H04N 7/18; H04N 7/181; H04N 7/183; G01C 11/025; G01C 11/02
See application file for complete search history.

(56) References Cited

U.S. PATENT DOCUMENTS

| | | | |
|---|---|---|---|
| 8,401,240 B2 * | 3/2013 | Dixon .................... G06T 7/246 | 382/104 |
| 2004/0038640 A1 * | 2/2004 | Mills .................. B60H 1/00028 | 454/121 |
| 2005/0082390 A1 * | 4/2005 | Ferrono ............. B60H 1/00264 | 239/332 |
| 2006/0033847 A1 * | 2/2006 | Kim ..................... F16M 11/105 | 348/836 |
| 2009/0185036 A1 * | 7/2009 | Bowron ........... G08B 13/19632 | 348/151 |
| 2015/0181174 A1 * | 6/2015 | Nordenfelt ............. H04N 5/232 | 348/143 |
| 2015/0210287 A1 * | 7/2015 | Penilla .................. B60W 40/08 | 701/49 |

(Continued)

*Primary Examiner* — Shawn S An
(74) *Attorney, Agent, or Firm* — Andrew S. Naglestad

(57) ABSTRACT

An aerial drone system configured to serve as personal drone assistance is disclosed. The drone assistant is configured to follow the user and provide (1) audiovisual output including video, audio, and navigation, (2) environmental comfort including shade, light, misters for the benefit of the user, as well as (3) privacy and security. To provide audiovisual output, the drone is configured to track the user and maintain a constant height and distance relative to the user, preferably a few feet away in front of the user. To provide environmental comfort including shade, for example, the drone is configured to automatically maintain a position between the user and the sun, thus causing a shadow to be continually cast on the user. This shading is enhanced by specialized louvres and screens configured to prevent any direct sunlight from directly impinging on the user.

20 Claims, 9 Drawing Sheets

(56) References Cited

U.S. PATENT DOCUMENTS

2016/0185472 A1* 6/2016 Blincow .............. B64G 1/1078
                                                    29/650
2017/0144758 A1* 5/2017 Myslinski ............. B64C 39/024
2017/0276763 A1* 9/2017 Howard .............. H04L 61/6022

* cited by examiner

US 11,434,002 B1

PERSONAL DRONE ASSISTANT

TECHNICAL FIELD

The invention relates to an unmanned aerial vehicle (UAV) to follow and assist a user during the course of the day. In particular, the invention relates to a drone for providing various forms of assistance, including communications, entertainment, and shade, to its owner.

BACKGROUND

Drones, quadcopters, and other forms of unmanned aerial vehicles are being used for all varieties of filmmaking and surveillance because of their ability to stay a flight for increasingly long periods of time as well as their ability to get access to almost anywhere with ease. When used for filming or surveillance, these drones may be guided long distances and to high altitudes to capture video of areas and events that virtually no person could achieve on his or her own. Despite this rapid adoption, however, drones have not been employed to provide services or personal assistance to users to date. There is, therefore, a need and opportunity to design drones to interact with people and provide assistance to people in ways only a drone could.

SUMMARY

The invention in some embodiments features an aerial drone system configured to track the position of a user, track the position of the sun, automatically fly to a position between the user and sun, and thereafter maintain the position between the user and sun as the user moves. In this position between the user and the sun, the drone provides continuous shade independent of where the user moves. To enhance the quality of the shade, the drone further includes a housing with a plurality of air ducts, these air ducts including a plurality of louvres oriented to block sunlight from passing through the air ducts. These louvres may include inlet louvres and outlet louvres oriented at different angles to block sunlight from passing through the air ducts and to the user. Opaque screens or panels may also be used to block sunlight around a periphery of the housing. These opaque screens may be configured to rotate down and form the landing gear on which the drone rests during landings.

In some embodiments, the aerial drone system is also configured to track the position of the user, automatically fly to a position at a determined height and determined distance relative to the user, and maintain the position at the determined height and determined distance relative to the user as the user moves. This enables the drone to maintain a constant position a few feet, for example, in front of the user, thus enabling the user to see and interact with the drone. With the drone in the position near the user, the drone may employ a light to illuminate the user and environment, an LCD display to show movies or other content for the user, a microphone for receiving audio commands from the user, a water reservoir and mister for misting the user, a projector and speaker for presenting audio-visual content to the user, at least one battery and solar panel for charging the battery, and a retractable hook or grabber. Each of these components may be activated and controlled via the user's mobile phone or other computing device, which employs a user interface with control switches for these components.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

We could all use a personal assistant to provide a helping hand throughout the day. The present invention includes a drone configured to follow the user through the day and night, and provide that assistance when requested or automatically, as defined by the user. The user may request assistance using voice commands, gesture commands, commands from a mobile device, or the like. In response, this personal drone assistant is configured to follow the user and provide (1) audiovisual output including video, audio, and navigation, as well as (2) environmental comfort including shade, light, misters for the benefit of the user.

Figure 1:
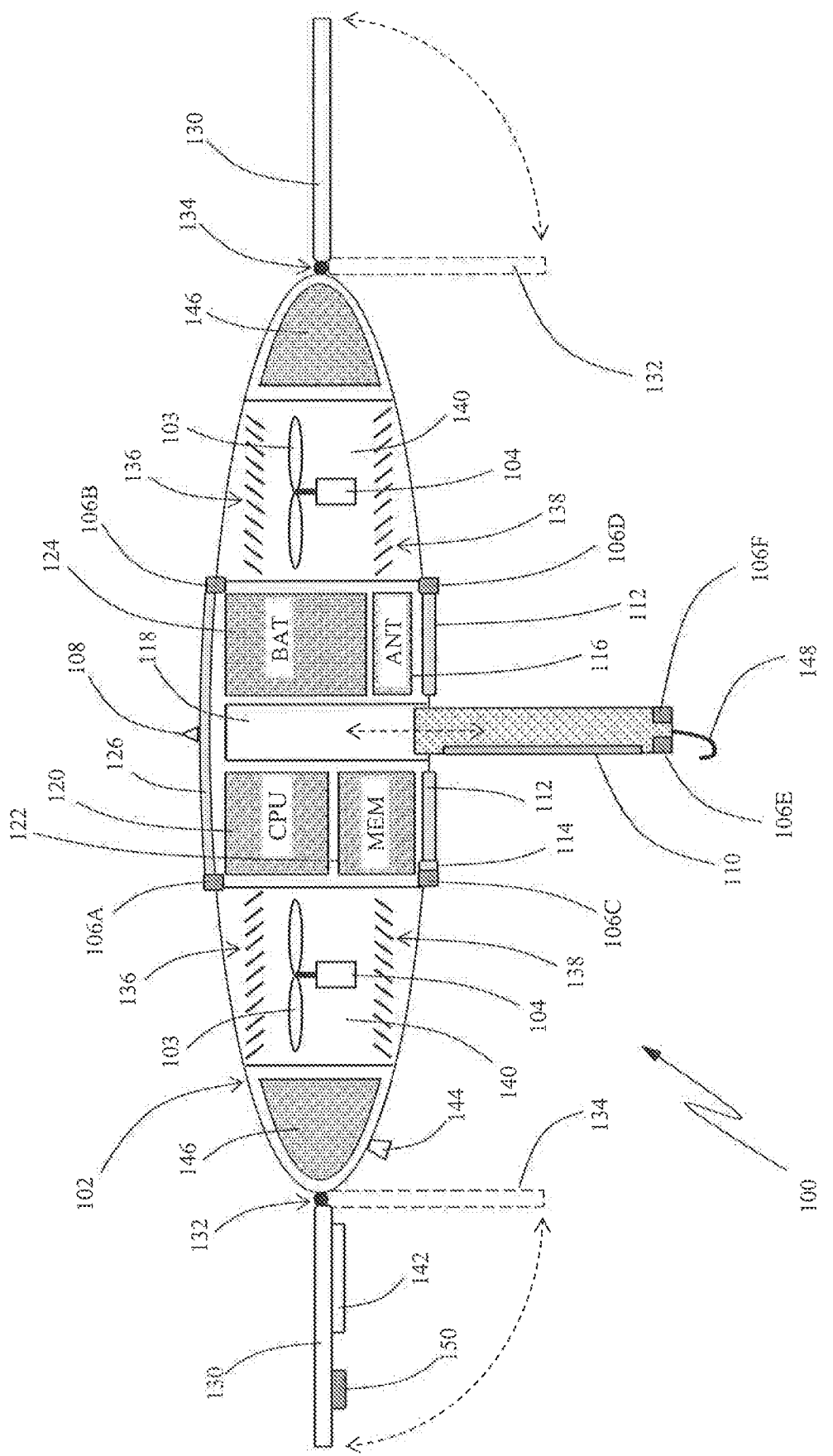
FIG. 1 is cross sectional view of the personal assistant drone, in accordance with a preferred embodiment of the present invention.
Figure 2:
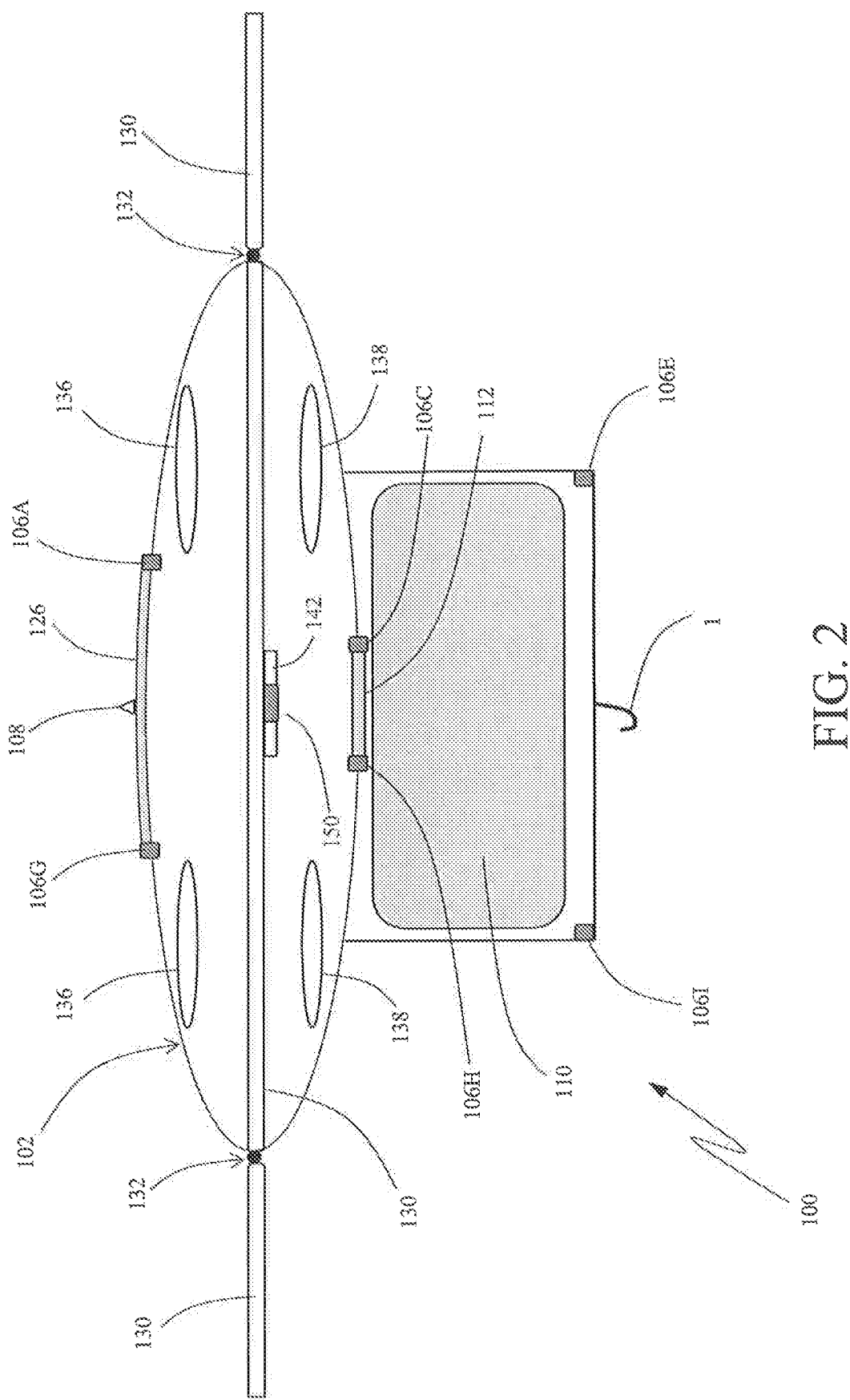
FIG. 2 is side view of the personal assistant drone, in accordance with a preferred embodiment of the present invention.
Figure 3:
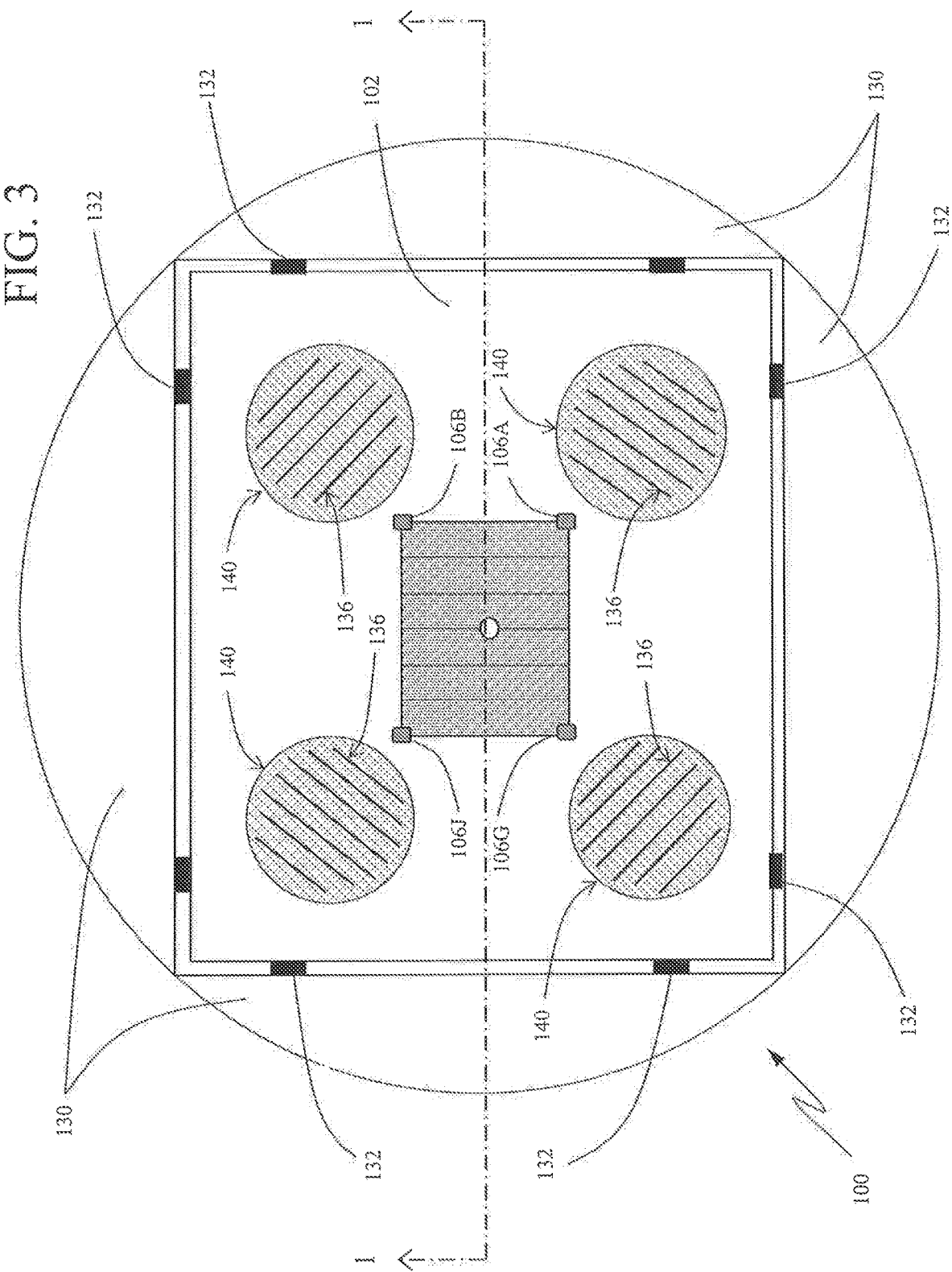
FIG. 3 is a top side view of the personal assistant drone, in accordance with a preferred embodiment of the present invention.

Depicted in FIGS. 1-3 are diagrammatic illustrations of the personal assistant drone 100 in the preferred embodiment of the present invention, FIG. 1 is cross sectional view, FIG. 2 is side view, and FIG. 3 is a top side view of the personal assistant drone (PAD). The PAD includes a housing 102 and a plurality of propellers 103 coupled to electric motors 104 for keeping the PAD airborne. The housing comprises various sensors, user interfaces, and internal electronic components. The various sensors include digital video cameras 106A-106J mounted on the top and bottom of the housing where they are oriented to provide a 360 degree view of the environment through which the PAD is flying, both above and below the PAD. The images acquired by the video cameras may be stitched together using techniques known to those skilled in the art in order to provide complete panoramic views of the people, structures, and objects in the space surrounding the PAD and the user. In addition, a solar sensor 108 mounted on the upper portion of the PAD may be used to detect the azimuth and elevations angles of the sun for purposes of sun tracking, as described in more detail below.

The user interfaces integrated into the housing may include, but are not limited to, one or more video screens or other type of display devices 110, one or more speakers 112, and one or more microphones 114. The display device 110 and speakers 112 may be configured to present any type of audio visual content and programming available on television, via the Internet, via software applications (a.k.a. Apps), or via wired and wireless content providers. A BLUETOOTH antenna 116 or other wireless device may be employed to operably couple the PAD to the user's mobile phone, for example, which can be used to transmit and receive information and commands, as explained in more detail below.

In the preferred embodiment, the display 110 is retractable. That is, the display may be fully extended below (or above) the housing when required by the user, or the display fully retracted into a recess 118 in the housing to protectively conceal the display when not in use. In other embodiments, the display device 110 is pivotably mounted to the housing, thus enabling the display device to rotate down to a position in which the user may view the screen, or pivot up where it lies flush with the underside of the housing.

The on-board electronics integrated into the housing or mounted within the housing may include one or more central processing units (CPUs) 120 for flying the PAD in an autonomous or semi-autonomous manner, one or more digital memory devices 122, one or more batteries 124 or other energy sources configured to power the motor-driven propellers as well as the on-board electronics, and photo-voltaic cells 126 mounted to the top of the PAD where it is configured to charge the batteries and provide power for the on-board electronics.

In addition to the components of the PAD housing described above, the PAD also includes structures for providing environmental comfort to improve the user's quality of life. The comfort structures including shading, lighting, and misting. In this embodiment, the shading structure includes one or more sun screens 130 configured to block light and effectively shade the user. The screens, which resemble large opaque wings or panels, are pivotably connected to the outer edges of the PAD housing 102 by means of hinges 132. During flight, the screens 130 are extended outward horizontally so as to increase the effective surface area of the PAD and therefor maximize the shadow cast by the PAD. When optimally positioned above the user, the PAD's shadow can be cast on the user to protect the user from excessive sunlight. During landing, however, the screens 130 in the preferred embodiment pivot downward to provide legs 134 that make contact with the ground during landing. Using the screens as legs effectively prevents the propellers from getting too close to the ground where they could pull up debris from the surface. In other embodiments, the plurality of sun screens 130 form an aperture configured to swing or slide between a first position in which more sun is blocked and a second position in which less sun is blocked.

As shown in cross section in FIG. 3, the propellers 103 are recessed within air ducts 140, for both safety and efficiency of operation. Air is pulled into the air ducts via inlets above the housing and the air propelled downward through outlets below the housing. If left open, these ducts 140 would allow sunlight to pass through and impinge on the user even though the user desires shade. To prevent the light from passing, the PAD in some embodiments includes inlets with louvers 136 and outlets with louvers 138. The inlet louvers 136 and outlets louvers 138 each include a set of angled slats or flat strips at regular intervals to allow air to pass through.

In addition, the louvers 136 at the inlet are angled at approximately 60 to 90 degrees with respect to the louvers 138 at the outlet, thereby preventing most if not all the light from passing through the PAD and to the user.

In addition to sun screens, the PAD of the preferred embodiment includes one or more lights 142 facing downward and/or outward from the PAD. The lights may be selectively turned on and off by the user to provide illumination as needed. The lighting may be used to help the user to walk at night, for example, in order to provide safety and security. The lights may be affixed to the housing or mounted to the underside of the sun screens 130, which would allow the lights to be directed at different angles based on the orientation of the sun screens. The intensity of the light and angle may be adjusted by the user as needed via the mobile phone user interface.

The PAD in some embodiments further includes one or more misters 144 configured to spray the user with a mist of water. The water is stored in on-board reservoirs 146 and sprayed downward in response to a user command. The amount of water and rate at which mist is generated can be adjusted as needed by the user via the mobile phone user interface.

In some embodiments, the PAD is configured to carry or otherwise transport loads for the user. For example, the PAD may be configured with a retractable hook 148 or grabber that can hold a shopping bag or other item, thereby saving the user from carrying the bag, or hold an umbrella, thereby protecting the user from the rain. When not in use, the hook or grabber may swing or otherwise retract into a recess where it is concealed.

In some embodiments, the PAD includes a digital projector 150 for projecting images or video, for example, on a wall or other surface where the user and others may see it.

Figure 4:
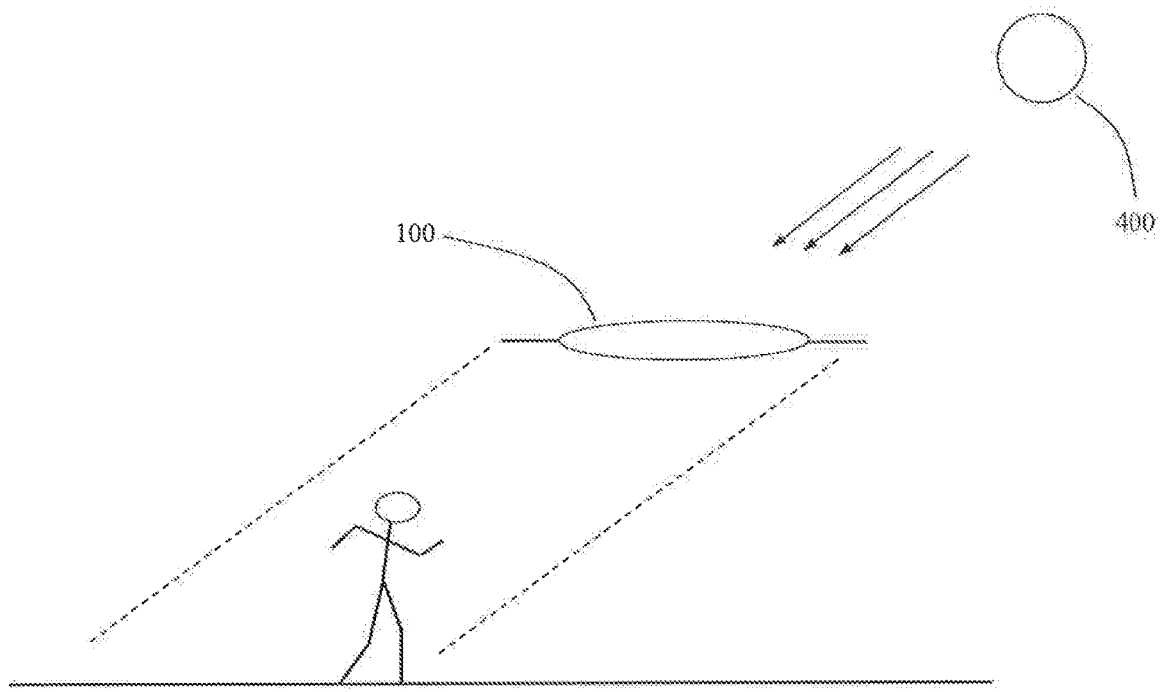
FIG. 4 is a diagrammatic illustration of the personal assistant drone casting a shadow on the user in the shade mode of operation, in accordance with a preferred embodiment of the present invention.
Figure 5:
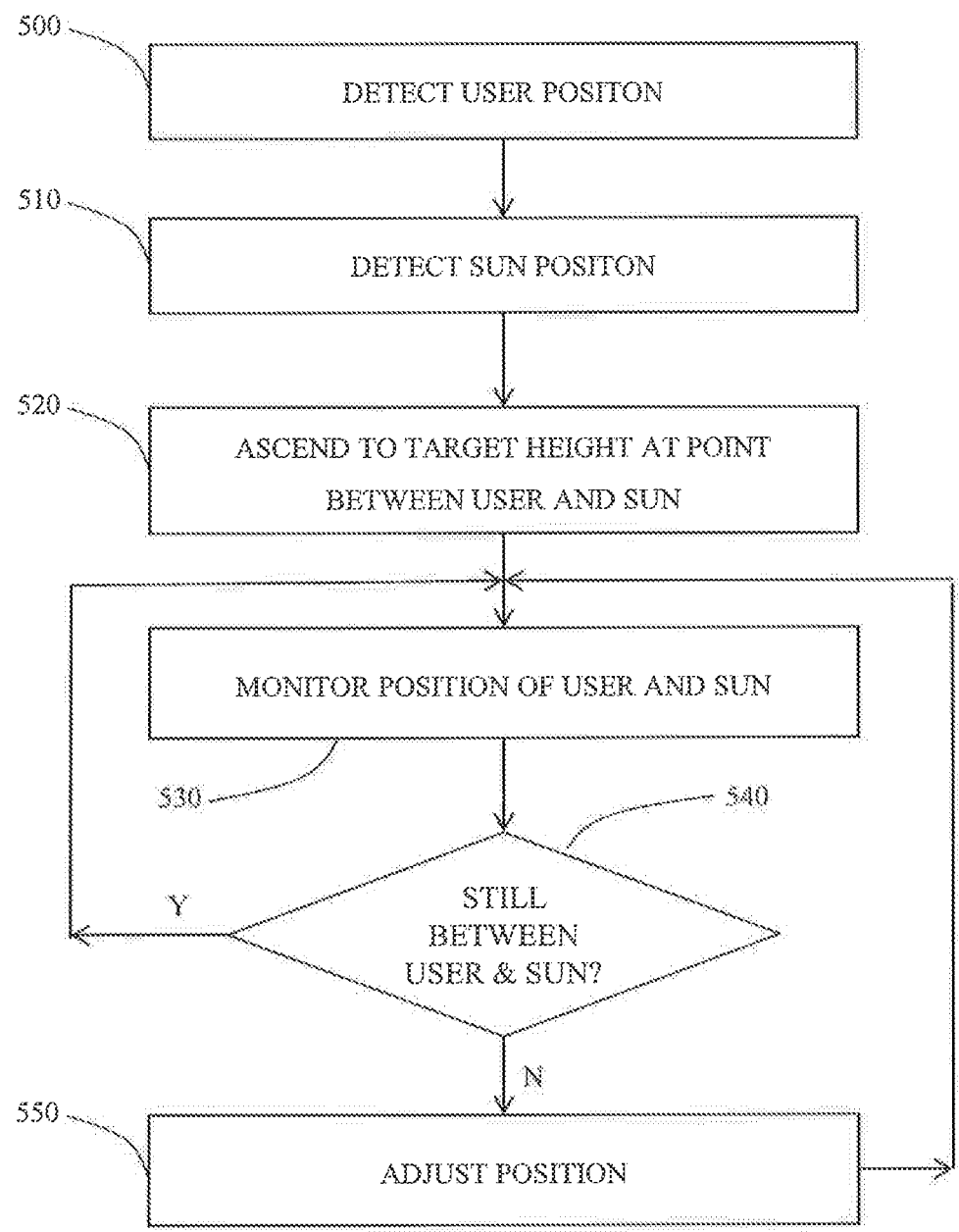
FIG. 5 is a flowchart of the shade mode for continually casting shade on the user, in accordance with a preferred embodiment of the present invention.

Illustrated in FIG. 4 is a shade mode of operation for the present invention. In the shade mode, the PAD 100 is configured to maintain a position above the user and between the user and the sun 400. As the user moves, walks, or runs, the PAD follows the user and maintains the position necessary to cast a shadow on the user. Although the PAD is configured to alter its height and position to avoid obstacles including trees and power lines, for example, the PAD is configured to maintain a shadow on the user to the degree permitted by the environment. In addition, the PAD is configured to alter its height and position to avoid collisions with objects moving toward the PAD, thereby preventing inadvertent collisions when the PAD is hovering in the path of a person, vehicle, or other oncoming object. When a user enters a confined space (for example, a building, car, train, airplane, etc.), the user can determine using their mobile phone interface, verbal commands, gestures, or their predetermined preference settings whether the PAD will continue following them, wait for the user outdoors, or land and temporarily shutdown The shade mode is described in more detail in the flowchart of FIG. 5. When the shade mode is selected by the user, the PAD first detects 500 the relative position of the user. The user may be identified using visual object recognition software, for example, or using a beacon carried by the user. The beacon may be the user's mobile phone, specifically the BLUETOOTH transmitter on the user's phone when linked to the BLUETOOTH receiver on the PAD. At or about the same time, the PAD also determines 510 the relative position of the sun. The sun may be identified using a dedicated optical sensor 108, for example, or identified from the video images taken by the on-board cameras 106A-106E. Once the user and sun are identified, the PAD automatically ascends 520 to a target height and a target position physically between the sun and the user.

If the elevation angles of the user and sun are measured from a horizontal plane, the proper position of the PAD is at the point where the sun in a positive angle θ above the horizontal plane and the user is at angle θ below the horizontal plane. In addition, the bearing of the sun should be 180 degrees opposite the bearing of the user. The PAD is configured to monitor 530 and maintain this position. If the proper positioning is lost because the user moved or the PAD was disturbed by the wind, for example, the decision block 540 is answered in the negative and the PAD automatically navigates 550 to a position between the user and the sun. In the preferred embodiment, the PAD employs a technique referred to as "optical flow" to distinguish the profile or silhouette of the user from the background. Once the user profile is detected, the PAD may be configured to cast a shade at the top of the profile to insure that the shadow is cast on the user's head, rather than the user's mid-section, for example.

Figure 6:
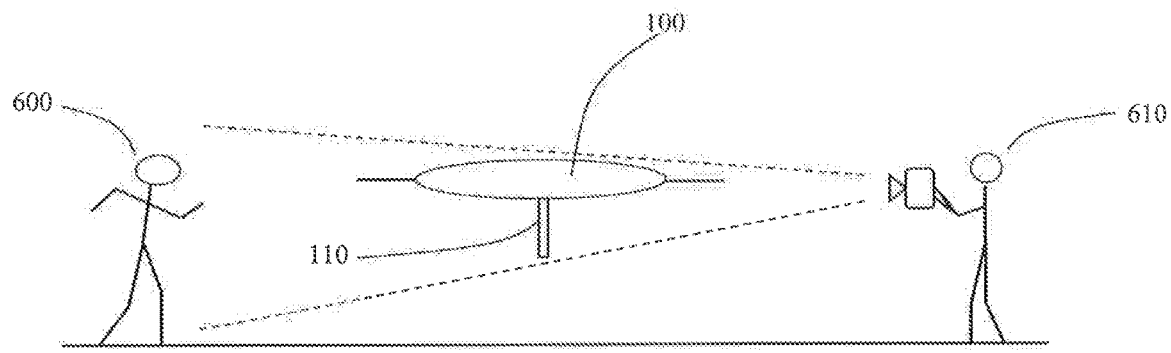
FIG. 6 is a diagrammatic illustration of the personal assistant drone protecting the user in a security mode of operation, in accordance with a preferred embodiment of the present invention.

In a second embodiment of the invention, the PAD is configured with a security mode in which it maintains a position between the user and a target designated by the user. The designated target may be a particular coordinate, an object, an animal, or even a person, for example. The PAD 100 may be configured to maintain the position between the user 600 and another person 610 to block the other person from seeing the user. Blocking the view of the user would be particularly advantageous if the target was, for example, a paparazzi armed with a camera or a soldier armed with a weapon. The security mode is illustrated in FIG. 6. As illustrated, the PAD blocks the target from viewing the user and may even extend the display to increase the size of the visual obstruction or blockage. In the case of military applications, the housing and other components of the PAD may be constructed from titanium, Kevlar, or other bulletproof material for the safety of the user.

Figure 7:
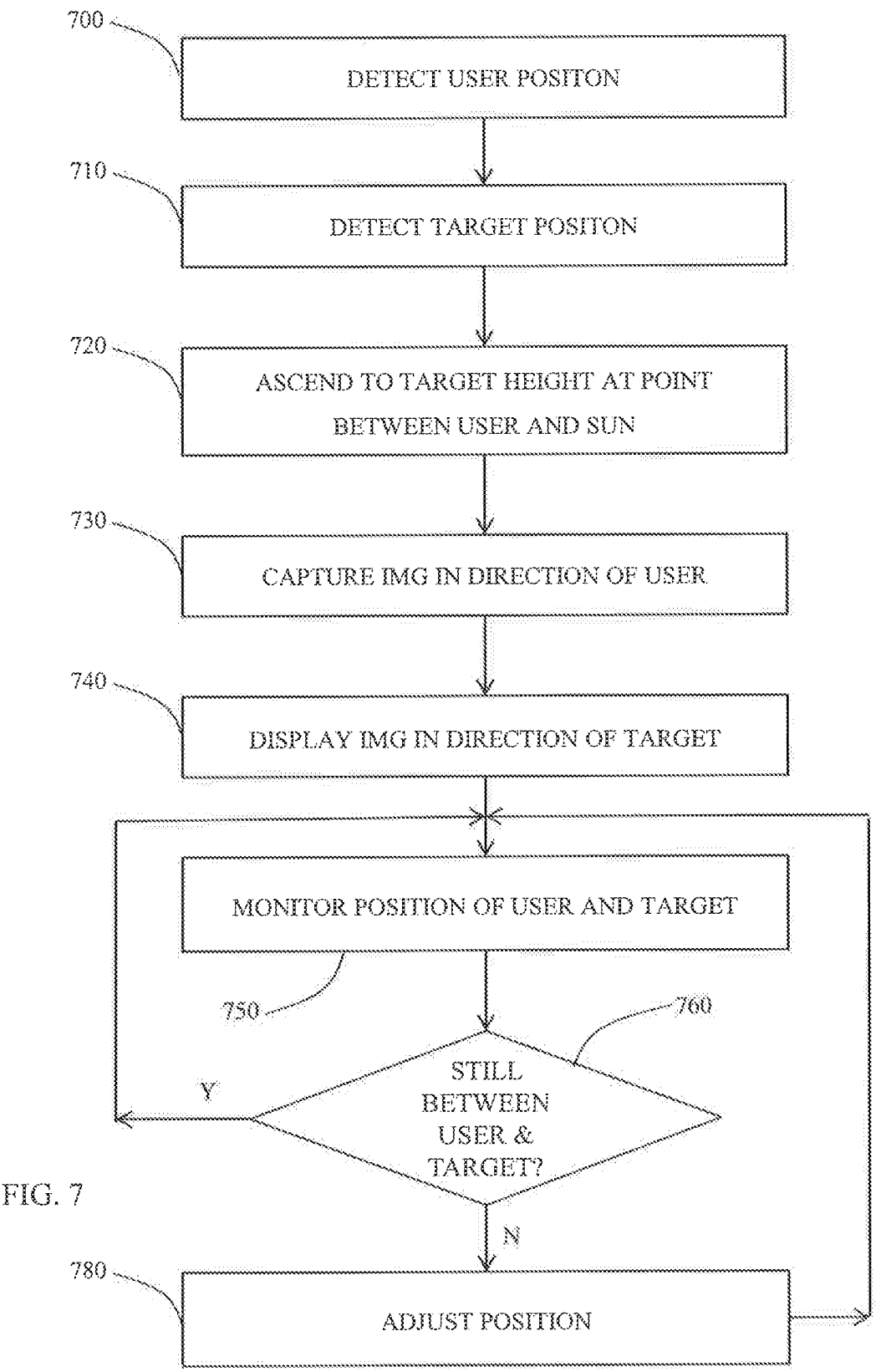
FIG. 7 is a flowchart of the security mode, in accordance with a preferred embodiment of the present invention.

The security mode is described in more detail in the flowchart of FIG. 7. When the security mode is selected by the user, the PAD first detects 700 the relative position of the user and detects 710 the position of the target. The target may be selected or otherwise indicated by the user. In one embodiment, the target is designated when the user uploads a picture of the target, which the PAD then searches for in the video input once the security mode is selected. In another embodiment, the user designates the target by pressing on an image of the target taken by an on-board camera. This target selection may occur using the image displayed on either the PAD display or the user's mobile phone device.

Once the PAD has locked onto the user and the target, the PAD ascends 720 to a position between the user and the target. To camouflage the user, the PAD may acquire 730 a background image in the general vicinity of the user (but not including the user) and display 740 this image in the direction of the target. Using this technique, the target is only permitted a view of the background without any apparent visual of the user.

The PAD continually monitors 750 the positions of the user and target. If and when the user and/or target moves, the decision block 760 is answered in the negative and the PAD adjusts 780 its position again to achieve a position between the user and target. The PAD therefore continues to insure the safety of the user until the target has left or the user turns off the security mode. In some embodiments, the PAD is further configured to alter its height and/or position when the target is too close (less than a predetermined distance) in order to prevent the target from contacting, moving, or disabling the PAD while it is protecting the user.

In some embodiments, the PAD is configured with a lead mode in which the PAD follows the user and maintains a selected height and position with respect to the user. This lead mode may be configured to automatically position the PAD at eye level, example, in the direction in which the user is moving. That is, the PAD may, be configured to maintain a position in front of the user, e.g., one to ten feet ahead of the user, where the user can see the display while the user is walking, for example. This lead mode thus enables the user to watch content on the display while on the move. The content may include a movie, for example, or a video stream of a conference call so that the user may participate in the meeting while in transit.

Figure 8:
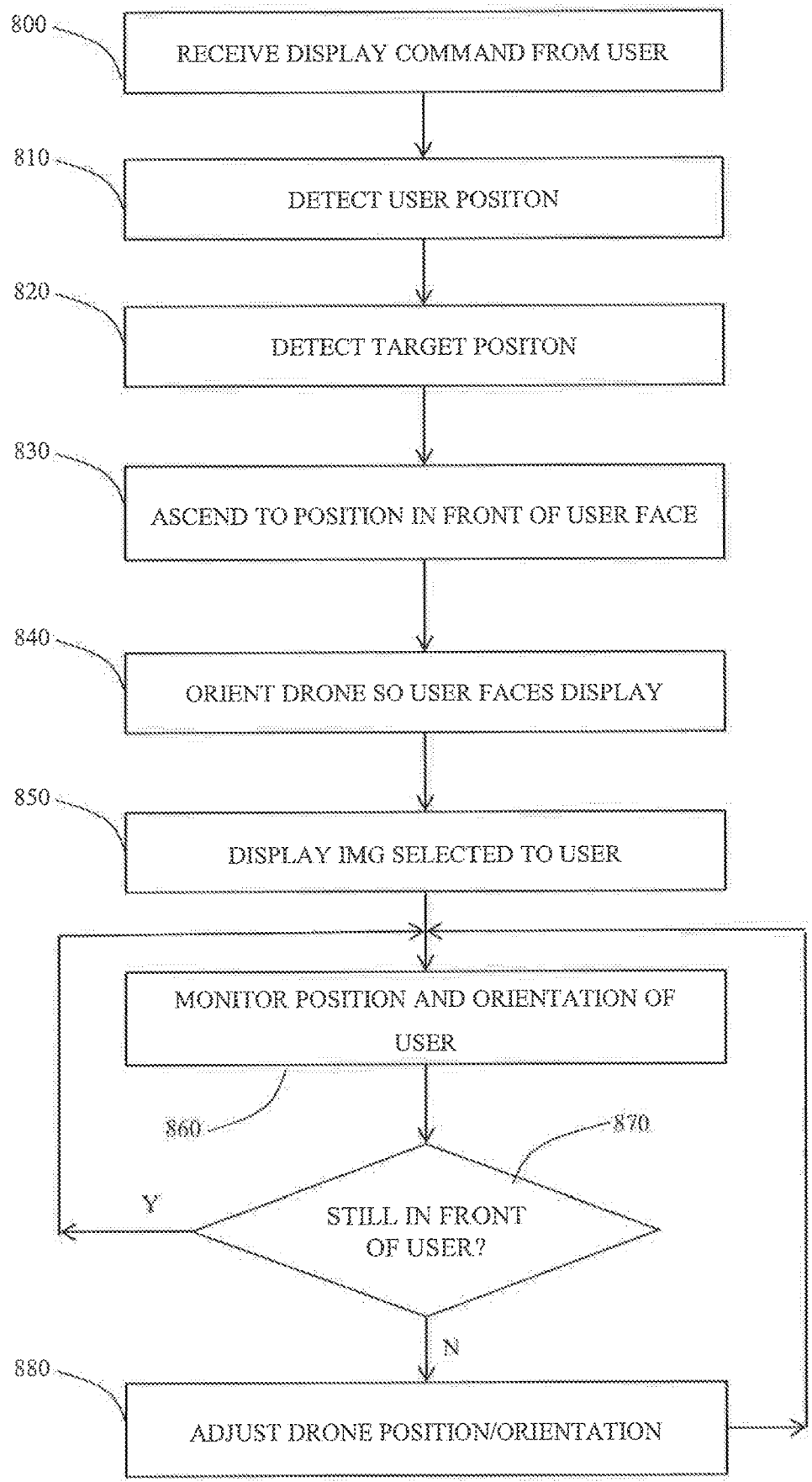
FIG. 8 is a flowchart of the lead mode, in accordance with a preferred embodiment of the present invention.

The lead mode is illustrated in the flow chart in FIG. 8. First, the PAD receives 800 a "display command" from the user to display selected content on the video screen. At or about the same time, the PAD determines 810 the position of the user and the direction 820 in which the user is facing. The PAD then ascends 830 to a position in front of the user's face and orients 840 the display such that it faces the user. The selected content is presented 850 to the user on the display. The user's position and face direction are continually monitored 860. If and when the user changes position or faces a different direction (referred to a "pose" for position and orientation) for an extended period of time (greater than 5 seconds, for example) the decision block 870 is answered in the negative and the position and/or orientation of the PAD adjusted 880 to place the display in a position in front of the user again. Using the lead mode, the user can continue to watch or otherwise engage with audio-visual content while walking or otherwise moving outdoors without the need to hold his or her mobile phone. In some embodiments, the PAD includes a mobile phone or a mobile phone holder to enable the user to engage in hands-free calls or video calls while actively moving about outdoors, for example. In some other embodiments, the display device 110 includes a touch-sensitive screen, which the user can press to enter inputs or to type on a digital keyboard, for example, while walking.

Figure 9:
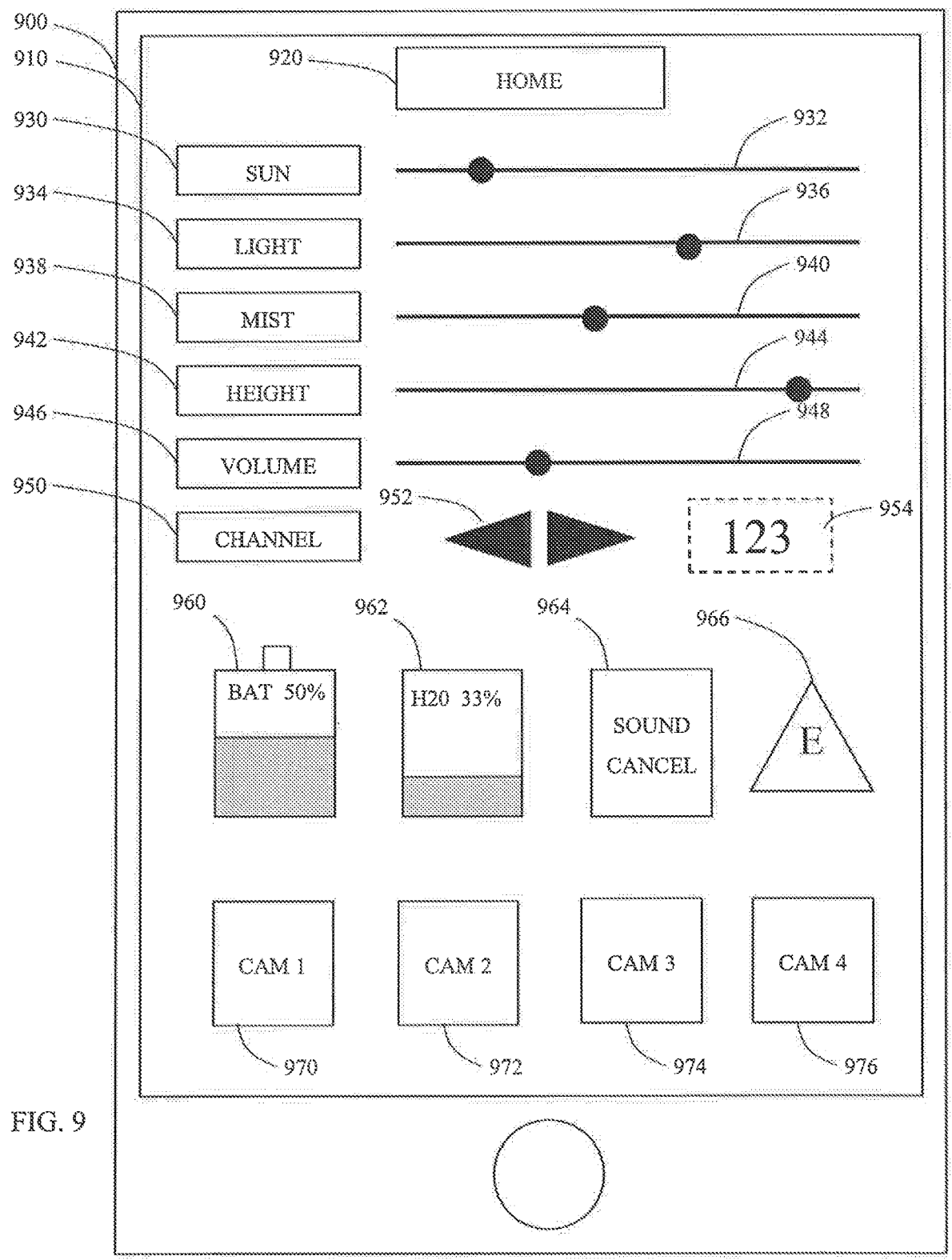
FIG. 9 is a diagrammatic illustration of a mobile device user interface for remotely controlling the personal assistant drone, in accordance with a preferred embodiment of the present invention.

Illustrated in FIG. 9 is an image of a mobile device 900 and user interface 910 for remotely controlling the PAD. The user interface is preferably a mobile app on a smart phone that is operably linked to the PAD. An operable link preferably includes secure authentication and digital encryption to insure that the user may control his or her PAD while preventing others from accessing it or controlling it. In the preferred embodiment, the user interface includes an interactive visual display that enables the user to control all the flight and operational parameters of the PAD. These controls include: an on/off switch 930 for the shade mode as well as a slider 932 to control the amount of shade (see FIG. 10 and discussion below); an on/off switch 934 for the light as well as a slider 936 to control the intensity of the light; an on/off switch 938 for the mister as well as a slider 940 to control the rate of mist dispensed; an on/off switch 942 for the height control as well as a slider 944 to control the actual target height of the PAD above the ground or above the user, for example; an on/off switch 946 for the speaker as well as a slider 948 to control the volume level; an channel/content select button 950 and up/down channel select buttons 952. A channel indicator 954 may be included to report the channel presently displayed for viewing on display 110.

In addition, the user interface 910 may include a power level reading 960 to report the percentage charge of the on-board battery or batteries; a water level reading 962 to report the percentage of water remaining in the on-board reservoir(s); a on/off switch 964 to toggle sound cancellation to reduce the sound of the PAD heard by the user; an emergency alert 966 to warn the user of a physical danger such as a flash flood or tornado warning in the area; and camera select buttons 970, 972, 974, 976 to select a video stream acquired by one of the plurality of cameras on board the PAD.

Figure 10:
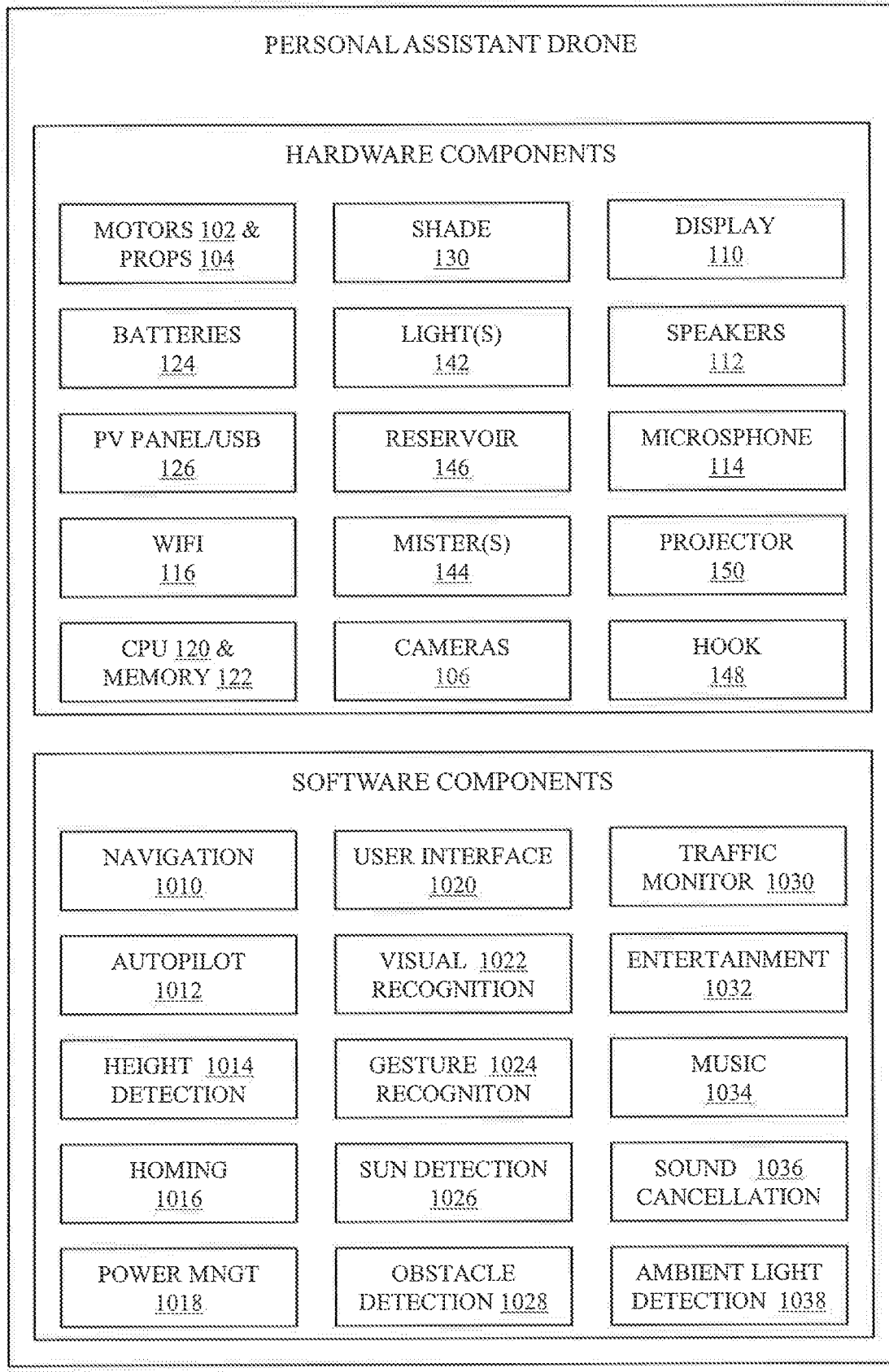
FIG. 10 is a functional block diagram of the personal assistant drone, in accordance with a preferred embodiment of the present invention.

Illustrated in FIG. 10 is a functional block diagram of the PAD of the preferred embodiment. The PAD generally includes hardware and software components, although firmware may also be employed. The hardware components generally include a plurality of electric motors 104 with each motor couple to a propeller 103; one or more batteries 124, one or more solar panels 126 for charging during flight and/or USB connector for charging from a power outlet; one or more WiFi transceivers 116; one or more CPUs 120 and/or controllers for providing auto-pilot and navigation functions, user tracking operations, target tracking operations, and position monitoring operations; retractable sun screens 130; one or more lights 142; a water reservoir 146; misters 144 for spraying mist; one or more user-controlled lights; a plurality of cameras 106 for collecting video or images of the user, target if applicable, and obstacles to be avoided during flight; an LCD display 110; one or more speakers 112; one or more microphones 114; a sun detector 108 for determining the angular position of the sun; a movie projector 150 or movie screen; and one or more retractable hooks 148 or graspers.

The software components generally include a navigation 1010 and/or auto-pilot 1012 processor; a GPS and height detection module to determine the height of the PAD above the ground; a homing device 1016 to return the PAD to the user; a power management module 1018; the user interface 1020; a face recognition processor and/or object recognition processor 1022 to identify and track the user, inter alia; a gesture recognition module 1024 to read and interpret gesture commands from the user; a sun detector 1026 for identifying the angular position of the sun from acquired images; an obstacle detection module 1028 and avoidance processor to insure that the PAD navigates around other people, trees, power lines, other PADS, and the like; a traffic monitor 1030 to guide the user to walk to a designated location or address while prompting the user with traffic signals (including walk/don't walk signs and red/green traffic signals, for example); an entertainment center 1032 to play back or stream various forms of digital content to the user including movies and music; a sound cancellation system 1036 to effectively reduce the noise from, for example, the PAD's motors; and an optional height detector 1038 to determine the distance of the PAD above the ground using, for example, stereoscopic representations of the ground.

In addition to the PAD, the preferred embodiment includes a mobile computing device configured with various controls to remotely control the PAD, as described herein above.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. An aerial drone system comprises:
a first processor configured to:
track a position of a user;
track a position of the sun;
automatically fly to a position directly between the user and sun wherein a shadow is cast on the user; and
automatically maintain the position directly between the user and sun as the user moves wherein a shadow is continually cast on the user.

2. The aerial drone system of claim 1, further comprising:
a housing with a plurality of air ducts; wherein the air ducts are configured to block sunlight from directly passing through the air ducts.

3. The aerial drone system of claim 2, further comprising a plurality of louvres oriented to block sunlight from directly passing through the air ducts.

4. The aerial drone system of claim 3, wherein the plurality of louvres comprise inlet louvres and outlet louvres oriented at different angles to block sunlight from directly passing through the air ducts.

5. The aerial drone system of claim 2, further comprising at least one opaque screen configured to block sunlight around a periphery of the housing.

6. The aerial drone system of claim 5, wherein the at least one opaque screen is pivotally connected to the housing; and wherein the opaque screen is configured to rotate between a substantially horizontal position and a substantially vertical position oriented downward.

7. The aerial drone system of claim 6, wherein the at least one opaque screen is configured to serve as landing gear for the aerial drone system when oriented downward.

8. The aerial drone system of claim 1,
a second processor configured to;
track a position of the user;

automatically fly to a position at a determined height and determined distance relative to the user; and automatically maintain the position at the determined height and determined distance relative to the user as the user moves.

9. The aerial drone system of claim 8, further comprising a light configured to illuminate the user.

10. The aerial drone system of claim 9, further comprising a display device and at least one speaker configured to present audio-visual content to the user.

11. The aerial drone system of claim 10, further comprising a mobile computing device configured to select the audio-visual content presented to the user on the display.

12. The aerial drone system of claim 11, wherein the display device is retractable into a housing.

13. The aerial drone system of claim 12, further comprising a plurality of video cameras and a third processor; wherein the third processor is configured to:
    detect the position of the user from image data from the plurality of video cameras;
    detect the position of the sun from image data from the plurality of video cameras;
    detect obstacles from image data from the plurality of video cameras; and
    automatically navigate the aerial drone system to avoid obstacles while maintaining the position relative to the user.

14. The aerial drone system of claim 13, further comprising:
    a microphone for receiving audio commands from the user;
    a water reservoir and mister for misting the user;
    a projector and speaker for presenting audio-visual content to the user;
    at least one battery and solar panel for charging the battery; and
    a retractable hook or grabber.

15. The aerial drone system of claim 14, wherein the mobile computing device comprises a user interface for setting said determined height, said determined distance, the audio-visual content presented on the display, the audio-visual content presented by the projector and speaker, and an amount of water dispensed by the mister.

16. The aerial drone system of claim 13, further comprising a fourth processor configured to:
    detect the position of the user;
    detect the position of a target;
    automatically fly to a position between the user and target; and
    automatically maintain the position between the user and target as the user and target move.

17. The aerial drone system of claim 16, wherein said target is a second person, wherein the aerial drone continually maintains a position directly between the user and the second person.

18. The aerial drone system of claim 1, wherein the position between the user and sun causes the aerial drone to continually cast a shadow on the user's head.

19. An aerial drone system comprises:
    a first processor configured to;
    track a position of a first person;
    track a position of a second person;
    automatically fly to a position directly between the first person and second person; and
    automatically maintain the position directly between the first person and second person; wherein the aerial drone continually blocks the second person from seeing the first person.

20. An aerial drone system comprises:
    a first processor configured to:
    track a position of a user based on a beacon or facial recognition;
    track a position of the sun based on a light sensor;
    automatically fly to a position directly between the user and sun;
    automatically maintain the position directly between the user and sun as the user moves; wherein the position between the user and sun causes the aerial drone to continually cast a shadow on the user's head; and
    recognize commands based on gestures made by the user.

* * * * *